(12) United States Patent
Meiri (10) Patent No.: US 7,870,195 B1
(45) Date of Patent: Jan. 11, 2011

(54) INTER-PROCESSOR MESSAGING (75) Inventor: David Meiri, Boston, MA (US)

(73) Assignee: EMC Corporation, Hopkinton, MA (US)

( * ) Notice: Subject to any disclaimer, the term of this patent is extended or adjusted under 35 U.S.C. 154(b) by 3123 days.

(21) Appl. No.: 09/768,323

(22) Filed: Jan. 24, 2001

(51) Int. Cl.
*G06F 15/16* (2006.01)

(52) U.S. Cl. .................. 709/206; 709/205; 709/209; 709/207; 709/213; 709/214

(58) Field of Classification Search ............. 379/93.02, 379/93.24, 100.08; 709/201, 212, 213, 214, 709/204, 205, 206, 207, 209, 11, 215, 229, 709/245 M
See application file for complete search history.

(56) References Cited

U.S. PATENT DOCUMENTS

| | | | | |
|---|---|---|---|---|
| 5,335,281 A | * | 8/1994 | Tugenberg et al. | 709/209 |
| 5,379,031 A | * | 1/1995 | Mondrosch et al. | 340/7.29 |
| 5,428,794 A | * | 6/1995 | Williams | 710/268 |
| 5,485,594 A | * | 1/1996 | Foster | 711/100 |
| 5,634,034 A | * | 5/1997 | Foster | 711/147 |
| 5,905,897 A | * | 5/1999 | Chou et al. | 710/260 |
| 6,151,329 A | * | 11/2000 | Berrada et al. | 370/447 |
| 6,301,262 B1 | * | 10/2001 | Peterson | 370/458 |
| 6,411,685 B1 | * | 6/2002 | O'Neal | 379/88.14 |
| 6,621,829 B1 | * | 9/2003 | Achilles et al. | 370/468 |
| 6,662,213 B1 | * | 12/2003 | Xie et al. | 709/206 |
| 6,775,690 B1 | * | 8/2004 | Creswell et al. | 709/206 |
| 6,883,018 B1 | * | 4/2005 | Meiri et al. | 709/205 |
| 2003/0061395 A1 | * | 3/2003 | Kingsbury et al. | 709/312 |

* cited by examiner

*Primary Examiner*—Barbara N Burgess
(74) *Attorney, Agent, or Firm*—Occhiuti Rohlicek & Tsao LLP (57) ABSTRACT

A data storage system in which a several processors communicate with each other includes a shared memory that is accessible to each of the processors. The shared memory has a message section having a message list made up of an ordered sequence of message slots in which processors leave message for each other. Each message slot includes a static-information repository for static information specifying all intended recipients of a message carried by the message slot as well as a dynamic-information repository for dynamic information specifying which of the intended recipients have already encountered the message slot.

25 Claims, 9 Drawing Sheets

INTER-PROCESSOR MESSAGING

This invention relates to distributed computing systems, and in particular, to inter-process communication.

BACKGROUND

A distributed computer system includes several processors that cooperate to perform a task. To cooperate more effectively, the processors often send messages to each other. One method of sending a message from one processor to another is to write the message in a shared memory and to arrange for each processor to periodically scan the shared memory for messages.

When a scanning processor scans the shared memory for messages, it typically locks the shared memory so that no other processor can access it. The scanning processor then scans the destination addresses for the messages in the shared memory and reads those that are addressed to it. Once the scanning processor has scanned the shared memory, it unlocks it so that other processors can again gain access to it.

As the number of processors sharing the memory becomes larger, the number of processors that periodically scan the memory inevitably increases. As the number of processors increases, the number of messages in shared memory usually increases. As a result, each such scan takes longer. With more processors scanning progressively more messages, and with only one processor at a time scanning the shared memory, it is no surprise that the fraction of the time during which shared memory is locked by a scanning processor increases. As a result, the probability that the shared memory will be locked when a processor requires access to it increases.

In a conventional messaging system, the scanning processor can take up to 1000 microseconds to complete a scan. Since a typical processor will scan for messages up to sixty times per second, each processor locks shared memory for up to 60,000 microseconds every second. With only ten processors, shared memory can be locked for as long as 600,000 microseconds every second. This is already more than half of the 1,000,000 microseconds available in every second. It is foreseeable, therefore, that as the number of processors increases, messages of great urgency may not be posted in shared memory promptly.

As messages accumulate in shared memory, it becomes necessary to remove those that have been read by their intended recipients. This task, which is referred to as "garbage collection", is typically performed by a separate utility that deletes messages that have already been read. During this process, shared memory is again locked. This further increases the fraction of time during which shared memory is unavailable to other processors.

SUMMARY

The invention provides a method and system for posting and retrieving messages to a message list that is accessible to a plurality of processors. The messages are posted and retrieved in a way that enables one or more processors to scan and retrieve messages from the message list while another processor is modifying the message list. This reduces the waiting time associated with retrieving messages because processors that require access to the message list do not have to wait for exclusive access to the message list.

A data storage system for carrying out the method of the invention includes a plurality of processors and a shared memory accessible to each processor in the plurality of processors. The shared memory includes a message section that has a message list made up of an ordered sequence of message slots. Each message slot includes: a static-information repository for storing information specifying all intended recipients of a message carried by that message slot; and a dynamic-information information repository for storing information specifying which of the intended recipients for that message have already encountered the message slot.

In one embodiment, the message section also includes a message directory that contains information concerning the message list. The message directory can include dynamic information indicating the existence, in the message list, of an unread message intended for a selected processor. This dynamic information can be stored in an attention mask having a data element corresponding to the selected processor. Such a data element has at least two states, one of which indicates that the processor does not have an unread message in the message list.

The message directory can also include such information about the message list as a first message pointer pointing to a first message-slot in the message list, a last-message pointer pointing to a last message-slot in the message list, and a length field indicating the number of message slots in the message list, and a lock field that, when set, prevents all but one of the processors from the plurality of processors from modifying the message section.

One implementation of a static-information repository is a destination mask having a plurality of data elements, each of which corresponds to one processor from the plurality of processors. Each such data element has a first state indicating that its corresponding processor is an intended recipient of the message and at least one other state indicating that its corresponding processor is not an intended recipient of the message.

A dynamic-information repository in a message slot can be implemented as an execution mask having a plurality of data elements. Each constituent data element of the execution mask corresponds to a processor from the plurality of processors. Each such data element has a first state indicating that its corresponding processor has encountered the message and a second state indicating that its corresponding processor has not yet encountered the message.

To post a message in the message list, a sending processor selects a new-message slot into which to place the message. The sending processor then modifies the new-message slot to indicate one or more intended recipients of the message. Then, the sending processor splices the new-message slot into the message list.

The message list typically includes a first existing-message slot having a pointer to a second existing-message slot. In one practice of the invention, the new-message slot is spliced into the message list by setting a first pointer on the new-message slot to point to the first existing-message slot and setting a second pointer on the new-message slot to point to the second existing message-slot. The pointer associated with the first existing-message slot can then be modified to point to the new-message slot.

An exemplary method for modifying the new-message slot to indicate one or more intended recipients is to modify a destination mask associated with the new-message slot. This destination mask includes information indicative of all intended recipients of the message. Typically, the destination mask is modified by selecting a constituent data element corresponding to a selected processor and modifying that selected data-element to indicate that that processor is an intended recipient. By repeating this procedure for each intended recipient of the message, the destination mask can be made to hold the identities of all intended recipients for the message.

The message-posting method optionally includes drawing attention to the presence of the new-message slot in the message list by updating a message directory accessible to the plurality of processors. This can include updating an attention mask containing information indicative of which processors have unread messages waiting in the message list. Updating of an attention mask can be performed by selecting from its constituent data-elements a selected data-element corresponding to the intended recipient, and then modifying that selected data-element to indicate the existence of a new message for the intended recipient.

To retrieve a message, a scanning processor determines whether the message list includes a message slot having a message intended for it. If the message list includes such a message slot, the scanning processor reads the message from the message slot and optionally modifies the message slot to indicate that it has read the message.

In one practice of the invention, a scanning processor determines whether it is an intended recipient for a message in a message slot by inspecting a destination mask associated with that message slot. The destination mask includes information indicative of all intended recipients of a message contained in the message slot. In one embodiment, the destination mask includes a plurality of constituent data elements, each of which is associated with a processor. In this embodiment, the scanning processor can inspect its corresponding constituent data-element. From this constituent data element, the scanning processor determines whether it is an intended recipient of the message contained in the message slot.

To determine whether any of the message slots in the message list includes a message for a scanning processor, the scanning processor inspects a message directory. The message directory contains information indicative of all processors having at least one unread message in the message list. One method for inspecting the message directory is to inspect an attention mask in the message directory. The attention mask includes information indicative of all processors having at least one unread message in the message list. An attention mask generally includes a plurality of constituent data elements, each one of which corresponds to a processor. One method for inspecting the attention mask is to inspect a constituent data-element from the attention mask, the constituent data-element corresponding to the scanning processor and being selected from a plurality of constituent data-elements, each of which corresponds to a processor from the plurality of processors. The scanning processor then determines, from the selected constituent data-element, whether it has an unread message in the message list.

In an additional practice of the invention, the scanning processor determines whether it has already encountered the message slot. One method for doing so is to inspect an execution mask associated with the message slot. The execution mask contains information indicative of which intended recipients for a message in the message slot have encountered the message. One method for inspecting the execution mask is to inspecting a constituent data-element from the execution mask, the constituent data-element corresponding to the scanning processor. Then, on the basis of the selected constituent date-element, the scanning processor determines whether it has already encountered the message slot.

In an optional practice of the invention, a scanning processor that encounters a message slot carrying a message for which it is an intended recipient records its encounter by modifying the message slot. This can be performed by modifying an execution mask associated with the message slot. The execution mask contains information indicative of which intended recipients for a message in the message slot have already encountered the message. To modify an execution mask, a scanning processor can select its corresponding constituent data-element from the execution mask and modify it to indicate that it has encountered that message slot.

Once a message slot has been encountered by all the intended recipients of its message, it can safely be removed from the message list. In an optional practice of the invention, a scanning processor removes such "spent" message slots as it scans the message list In one practice of the invention, a scanning processor removes a spent message slot from the message list by identifying a first message slot immediately preceding the spent message slot and a second message slot immediately following the spent message slot. The scanning processor then sets a pointer associated with the first message slot to point to the second message slot, thereby bypassing the spent message slot. The scanning processor can then mark the message slot as available for re-use by modifying its destination mask to indicate that the message contained in that slot has no intended recipients.

In some cases, a scanning processor may scan the entire message list without encountering any messages for which it is an intended recipient. In an optional feature of the invention, the scanning processor modifies the message directory to indicate that it scanned the entire message list without encountering any messages of interest. This permits the scanning processor to inspect the message directory to determine if scanning is necessary before it actually scans the message list.

DETAILED DESCRIPTION

Figure 1:
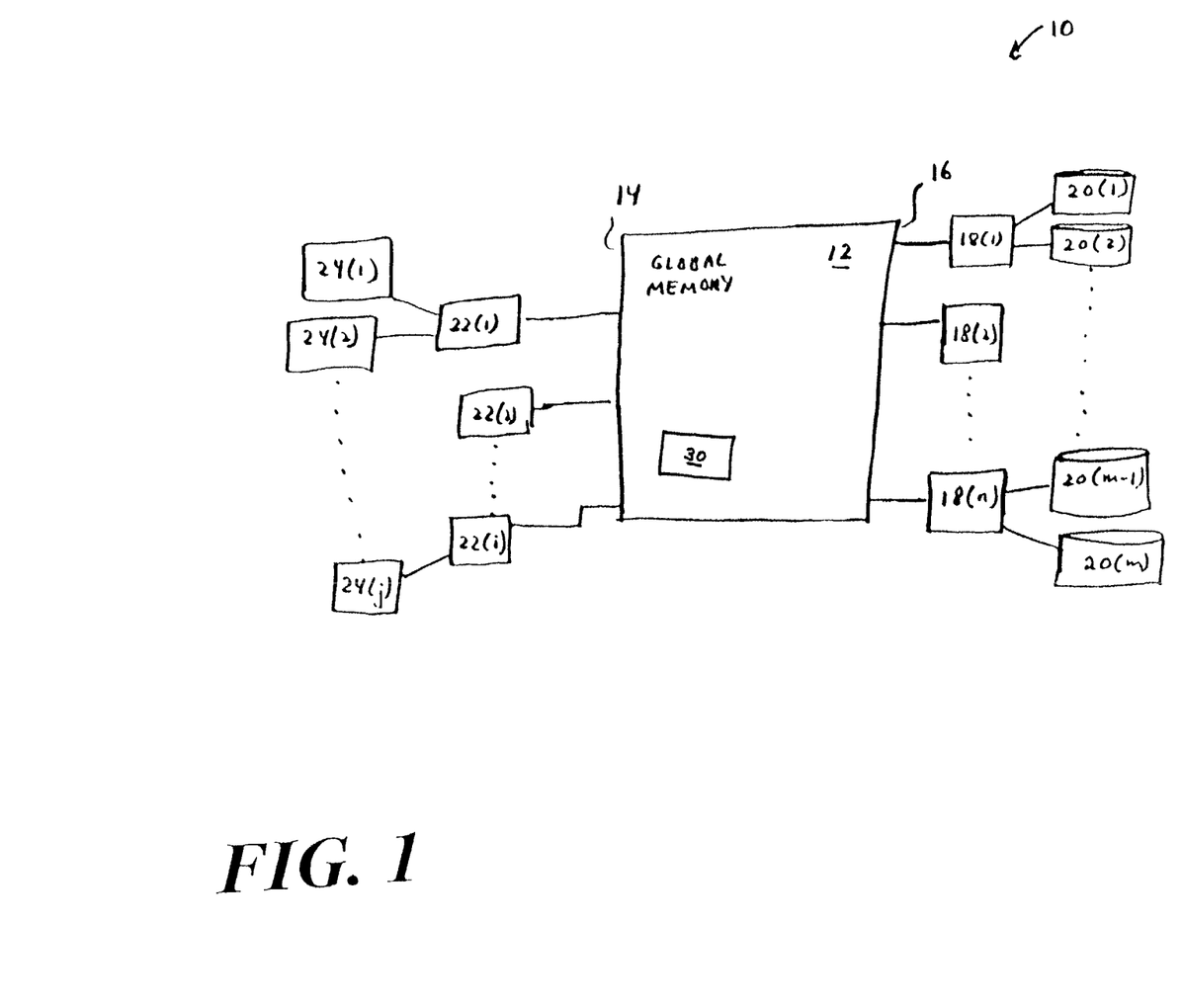
FIG. 1 shows a data storage system for implementing the messaging system of the invention.

FIG. 1 shows a data storage system 10 for practice of an inter-processor messaging system according to the invention. The data storage system 10 includes a global cache memory 12 (hereafter referred to as "shared memory") having a front-end 14 and a back end 16. At its back end 16, the shared memory 12 is in data communication with a plurality of device controllers 18(1)-18(n), each of which controls a plurality of mass-storage devices 20(1)-20(m). At its front end 14, the shared memory 12 is in data communication with a plurality of host adaptors 22(1)-22(i), each of which is in communication with a plurality of hosts 24(1)-24(j). The disk storage system can also include network interfaces 26(1)-26

(k) for managing such tasks as maintaining mirror data storage systems across a network. Each host adaptor 22, device controller 24, and network interface 26 includes its own associated processor.

Figure 2:
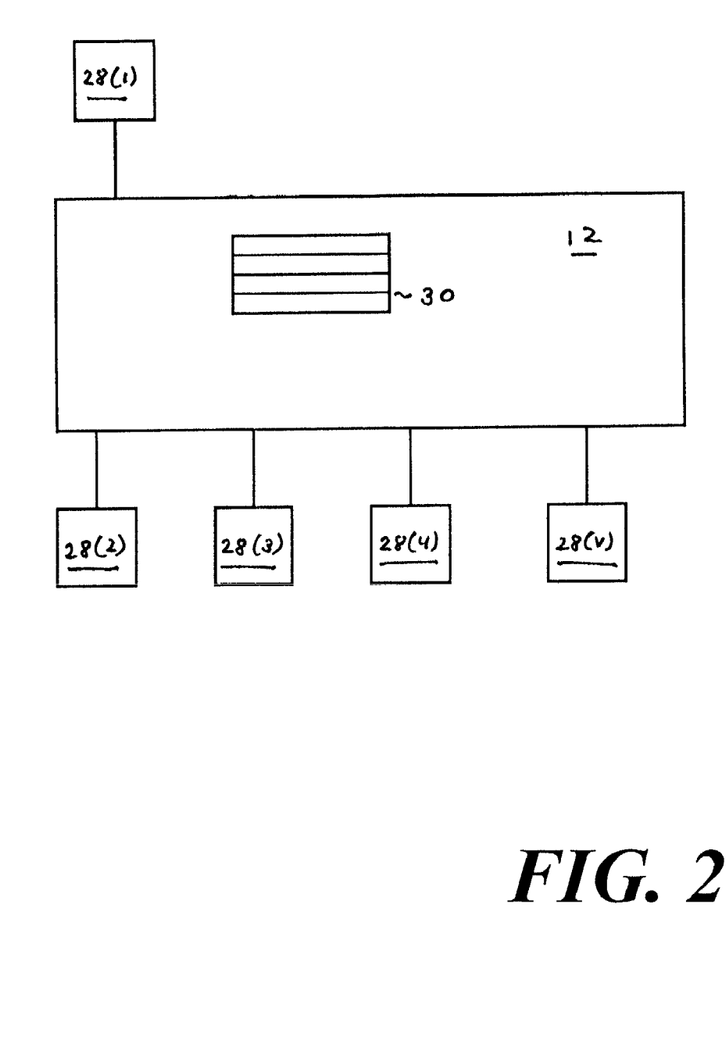
FIG. 2 shows the configuration of the shared memory in FIG. 1.

FIG. 2 shows the shared memory 12 in communication with the above-mentioned processors 28(1)-28(v) associated with the foregoing components. To cooperate effectively, the processors 28 communicate with each other. Since the processors 28 are not in direct communication with each other, a sending processor 28(1) that wishes to send a message to one or more receiving processors 28(2)-28(3) writes that message in a message section 30 in the shared memory 12. Each processor 28 then periodically checks the message section 30 for new messages.

Figure 3:
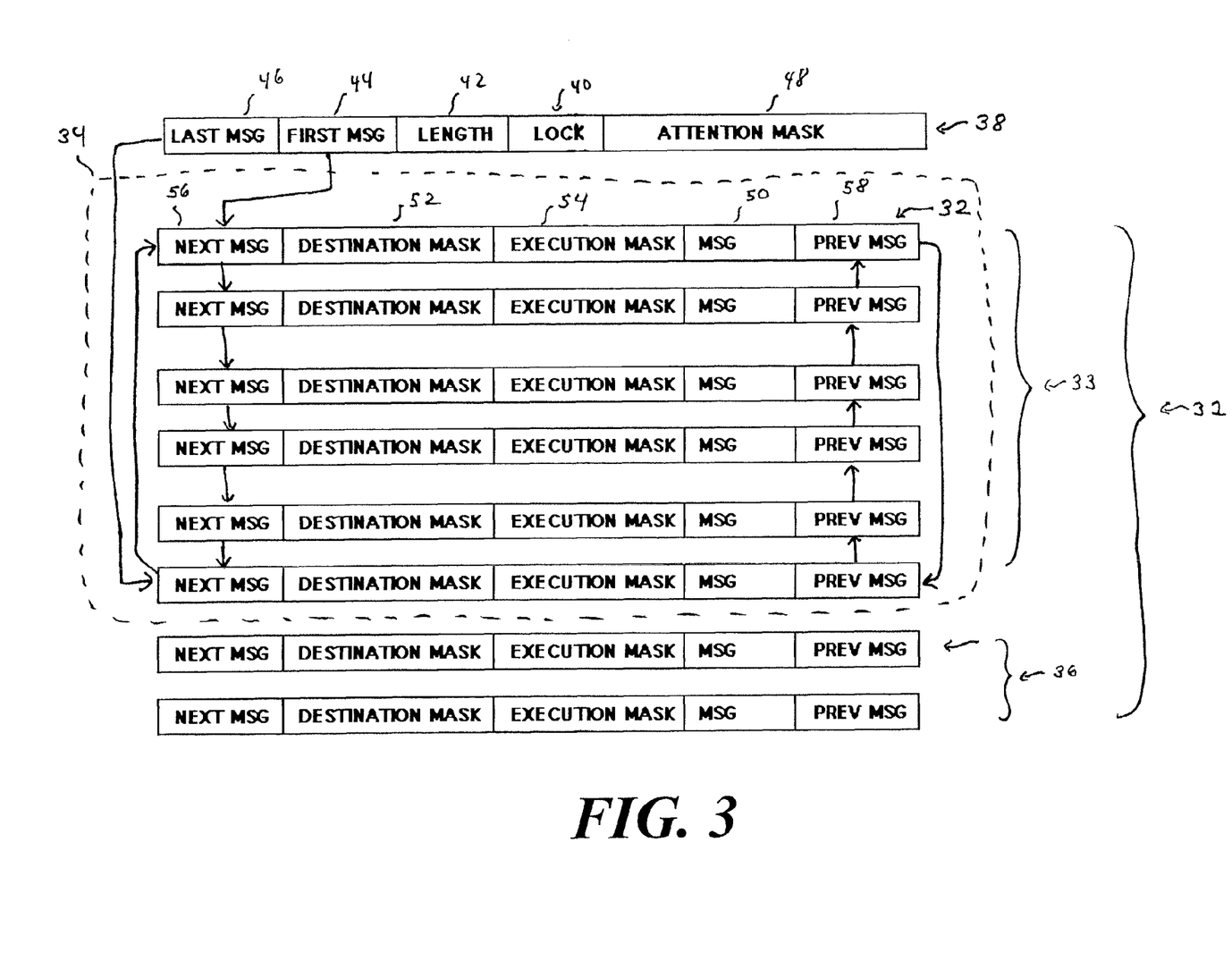
FIG. 3 shows the message section of FIG. 2.

The message section 30, shown in more detail in FIG. 3, includes a large number of message slots 32. Each message slot 32 (hereafter referred to as a "slot") can transition between a free state and an occupied state. An ordered sequence of occupied slots 33 linked to each other by pointers forms a message list 34. Free slots 36 remain available for transformation into occupied slots should there be a need to do so. An occupied slot 33 whose message has been read by all its intended recipients becomes a free slot 36 and is detached from the message list 34. The composition of the message list 34 thus constantly changes, as slots 32 transition between being free slots 36 and occupied slots 33.

The circulation of slots 32 into and out of the message list 34 is summarized by a message directory 38. The message directory 38 includes several fields, each of which can be changed or read by a processor. These fields include a lock field 40, a length field 42, a first-message pointer 44, a last-message pointer 46, and an attention mask 48.

The lock field 40 is set by a processor at specified times to avoid the occurrence of a race condition. When the lock field 40 is set, no other processor can modify the message section 30. It is therefore desirable that the interval during which the lock field 40 is set be as brief as possible.

The length field 42 contains the current number of slots in the message list 34. A processor that adds a message to the message list 34 increments the value of this length field 42. A processor that removes a message from the message list 34 decrements the value of the length field 42.

The first-message pointer 44 contains the memory address of the first slot in the message list 34. Similarly, the last-message pointer 46 contains the memory address of the last slot in the message list 34. The first and last-message pointers 44, 46 are adjusted by a processor in the course of inserting and removing slots from the message list 34. The last-message pointer 46 and the length field 42 enable a processor scanning the message list 34 to determine when to stop scanning.

Each processor is assigned one bit in the attention mask 48. When a sending processor intends a message to be received by one or more receiving processors, it modifies the attention mask 48 by setting the bit assigned to each of the receiving processors. When a receiving processor finishes reading all messages intended for it in the message list 34, it resets its assigned bit in the attention mask 48. The attention mask 48 thus functions as a dynamic listing of all processors that have at least one unread message in the message list 34.

Each slot 32 includes a message field 50 for holding a message, a destination mask 52, an execution mask 54, a next-message pointer 56, and a previous-message pointer 58. A processor can read the contents of a slot 32 at any time. However, a processor can only make changes to a slot 32 when shared memory 12 is unlocked.

Each processor is assigned a bit in the destination mask 52. A sending processor addresses a message by setting the assigned destination-mask bits for all the intended recipients of the message. The destination mask 52 is thus a static list of all the intended recipients for the message contained in the slot's message field 50.

The execution mask 54 is initially a copy of the destination mask 52. When an intended recipient has read the message contained in the message field 50, it resets its assigned bit in the execution mask 54. Consequently, once all the intended recipients of a message have read that message, the execution mask 54 will have been completely reset. The execution mask 54 of a slot thus functions as a dynamically changing list of those intended recipients who have yet to read the message carried by that slot. As a corollary, the execution mask 54 indicates when all the intended recipients of a message have read that message, and therefore when the message can be safely removed from the message list 34.

The next-message pointer 56 and the previous-message pointer 58 together indicate a slot's position in the ordered sequence of slots that make up the message list 34. The next-message pointer 56 shows the memory address of the immediately succeeding slot in the message list 34; the previous-message pointer 58 shows the memory address of the immediately preceding slot on the list.

Figure 4:
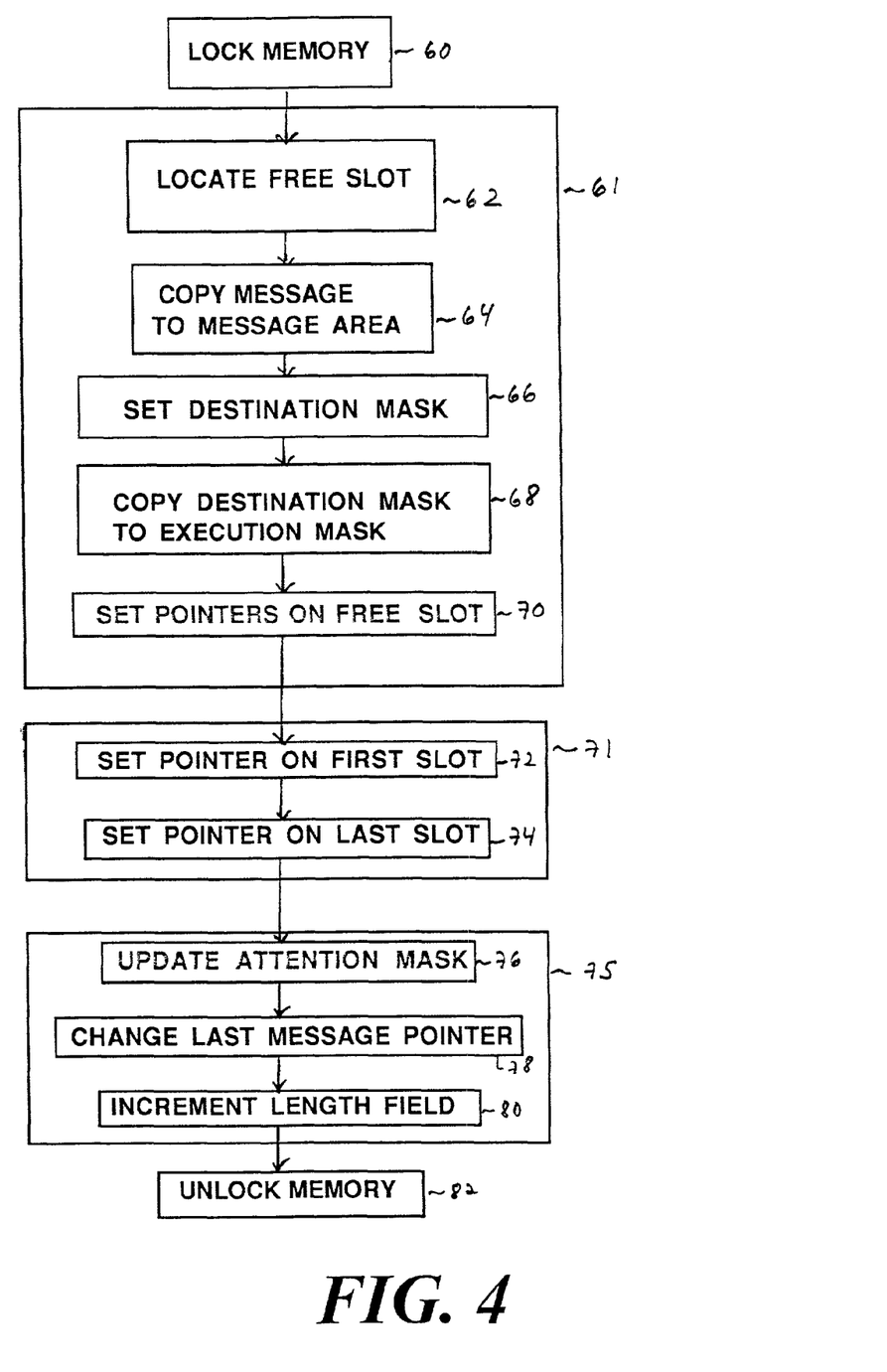
FIG. 4 is a flowchart of a process for adding a new message to the message list in FIG. 3.

FIG. 4 shows the process by which a sending processor leaves a message for one or more receiving processors. The sending processor begins by setting 60 the lock field 40 in the message directory 38. This prevents any other processor from altering the message list 34. It does not, however, prevent other processors from scanning the message list 34 to determine if any messages are present. The method of the invention thus permits one sending processor to add a new message to the message list 34 even while one or more scanning processors scan that list.

The sending processor then begins the process of creating 61 a valid message by first selecting 62 a new-message slot into which a message can be placed. It does so by reading the last-message pointer 46 in the message directory 38 to determine the memory address of the last slot in the message list 34. The slot following the last slot on the message list 34 is then designated as a candidate new-message slot, or "candidate slot". The sending processor then checks to see that the destination mask 52 of the candidate slot is completely reset. If it is, the sending processor designates the candidate slot to be the new-message slot. Otherwise, the sending processor locates another candidate slot and repeats the foregoing procedure. This process continues until the sending processor locates a slot that has a completely reset destination mask 54.

The sending processor needs not check the destination mask 52 of the candidate slot as described above. Instead, the sending processor can assume that the next slot following the last slot on the message list 34 is the next-free-slot. Although this will be true in most cases, there are rare exceptions. By checking the destination mask 52, the sending processor confirms that the candidate slot is in fact a free slot. Since checking the destination mask 52 is not a significantly time-consuming operation, the process of identifying a new-message slot can be carried out rapidly.

Once the sending processor has designated the new-message slot, it writes 64 its message in the message field 50 of that slot. The sending processor then sets 66 the destination mask 52 of the new-message slot to correspond to the intended recipients of the message. It does so by ensuring that those bits in the destination mask 52 that correspond to intended recipients are set and that the remaining bits in the destination mask 52 are reset. After having set the destination mask 52, the sending processor copies 68 the destination mask 52 to the execution mask 54 of the new-message slot.

Although the new-message slot now holds a valid message, the message remains inaccessible to its intended recipients until the new-message slot is spliced into the message list 34. In preparation for splicing the new-message slot into the message list 34, the sending processor modifies 70 the next-message and previous-message pointers of the new-message slot so that they point to the first slot in the message list 34 and to the last slot in the message list 34 respectively.

With the new-message slot now ready for splicing, the sending processor splices 71 it into the message list 34. To do so, the sending processor modifies 72, 74 the previous-message pointer 58 of the first slot on the message list 34 and the next-message pointer 56 of the last slot on the message list 34 so that they both point to the new-message slot. This splices the new-message slot into the message list 34 between the first slot and what was formerly the last slot on the message list 34. At the completion of this operation, the new-message slot becomes the last slot on the message list 34.

Although the new message is now in the message list 34, the intended recipients may not know of the message's existence. To announce 75 the existence of the new message to the intended recipients, the sending processor updates 76 the attention mask 48 of the message directory 38 by setting the attention mask bits assigned to the intended recipient of the new message.

In one practice of the invention, the sending processor updates the attention mask 48 by evaluating the OR of the new message's destination mask 52 and the attention mask 48 and then overwriting the attention mask 48 with the result of this operation. Then, the sending processor changes 78 the last-message pointer 46 in the message directory 38 to point to the new-message slot (which is now the last slot) in the message list 34. The sending processor also increments 80 the length field 42 in the message directory 38. Finally, the sending processor unlocks 82 the shared memory 12.

Figure 5:
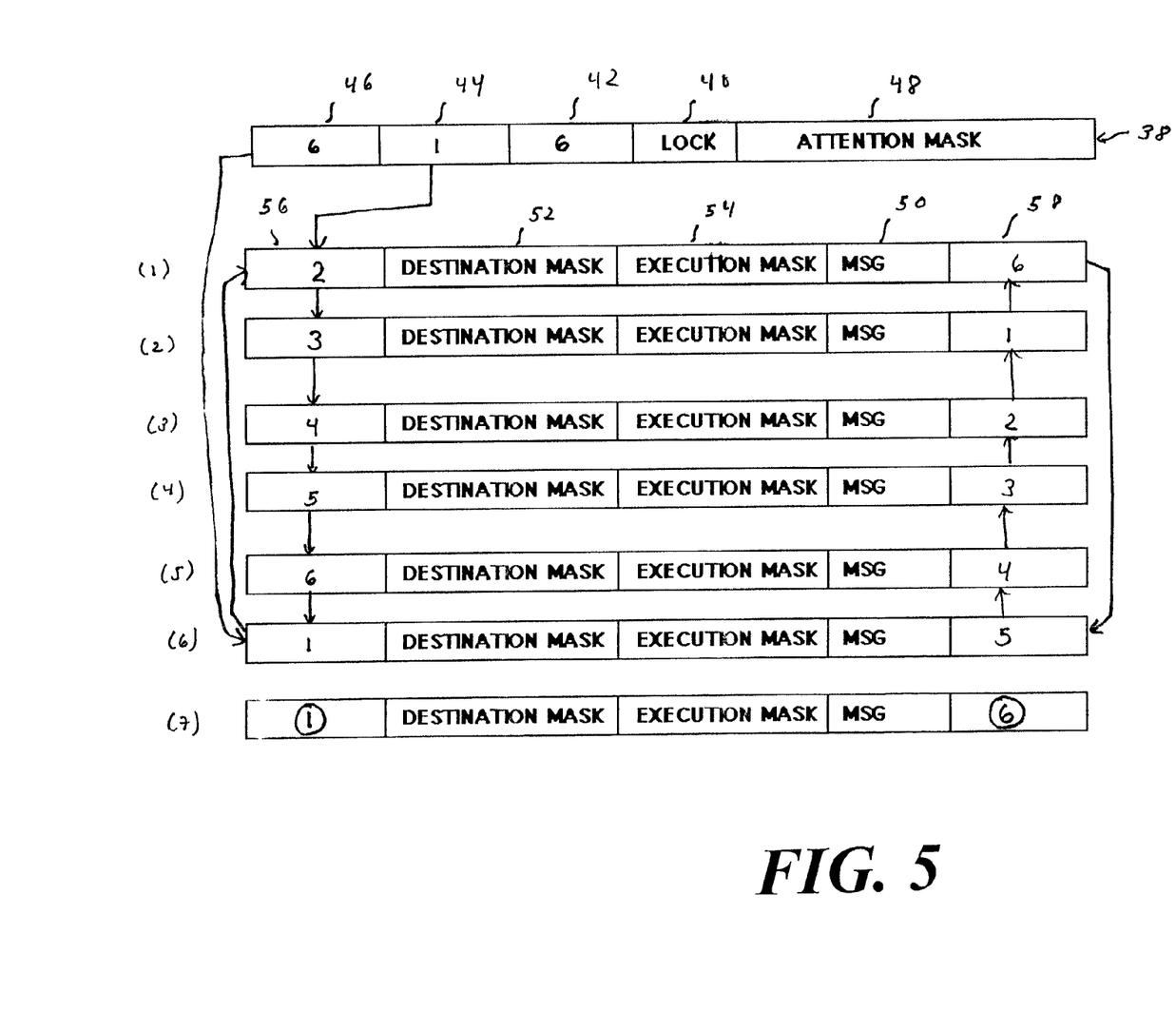
FIG. 5 shows the message list of FIG. 3 before adding a new message.

FIG. 5 shows the state of the message section 30 just before the sending processor splices a new message into the message list 34. As indicated by the message directory 38, the message list 34 has six slots linked to each other by pairs of pointers. The slots are numbered from 1 to 7 with the understanding that these numbers are selected to facilitate an understanding of the process. In fact, a slot is identified by a memory address. Although the message list 34 is an ordered sequence of slots, the slots themselves need not be sequentially numbered in memory space.

As indicated by the message directory 38, the first slot of the list is slot 1 and the last slot is slot 6. The previous-message pointer 58 of slot 1 points to the last slot, namely slot 6. The next-message pointer 56 of the last slot points back to the first slot, namely slot 1. The message list 34 is thus a cyclical list. Although the foregoing discussion refers to a first slot and a last slot on the message list 34, the designation of which particular slot is the first slot is arbitrary because the message list 34 is cyclical. Hence, just as a circle has no beginning or end, a cyclical message list 34 of message slots has no natural first or last message slot.

The new-message slot, namely slot 7, is shown with its next-message pointer 56 already pointing to the first slot of the message list 34 and its previous-message pointer 58 already pointing to what is currently the last slot in the message list 34, namely slot 6. The new-message slot is thus primed for replacing slot 6 as the last slot on the message list 34.

Figure 6:
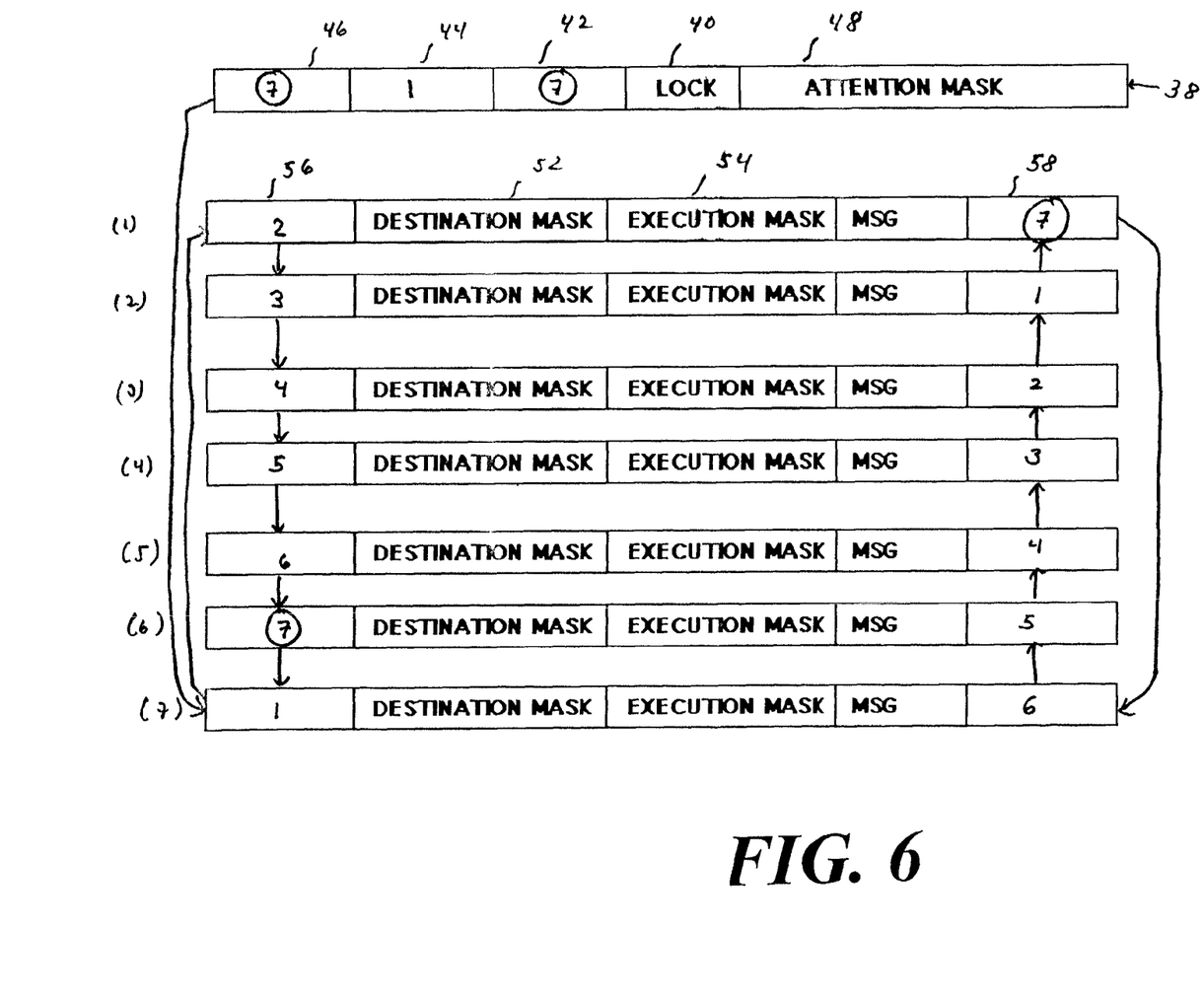
FIG. 6 shows the message list of FIG. 5 after adding a new message.

FIG. 6 shows the result of splicing slot 7 into the message list 34. A comparison of FIGS. 5 and 6 shows that only the previous-message pointer 58 of the first slot (which now points to slot 7 instead of to slot 6) and the next-message pointer 56 of slot 6 (which now points to slot 7 instead of back to slot 1) have changed. In addition, the message directory 38 has been updated to show that there are now seven slots in the message list 34, with the last slot now being slot 7. The attention mask 48 in the message directory 38 may or may not have changed, depending on whether all the recipients of the message in slot 7 already have pending messages in the message list 34.

By splicing a new-message slot into the message list 34 in the manner described above, the inter-processor messaging system of the invention enables a processor to scan the message list 34 even while a new message is being added to the message list 34.

For example, in the case shown in FIGS. 5 and 6, a processor scanning the message list 34 will reach slot 6 either before or after the splicing operation is complete. If the scanning processor encounters slot 6 after a sending processor has completed the splicing operation (FIG. 6), the next-message pointer 56 of slot 6 will direct it to the newly-inserted message in slot 7. If the scanning processor reaches slot 6 before a sending processor has managed to complete the splicing operation (FIG. 5), the next-message pointer 56 of slot 2 will direct it back to slot 1, thereby bypassing the new message. In this latter case, the scanning processor will miss the new message of slot 7 on this scan but will see it on its next scan. In either case, however, the integrity of the message list 34 is sustained.

In another practice of the invention, the scanning processor only scans until it has reached the last message, as determined by the last-message pointer 46 or until it has scanned a number of slots equal to the length of the message list, as specified by the length field 42. In either case, if the scanning processor encounters slot 6 before the sending processor completes splicing the new-message slot into the message list, it will stop scanning. This is because until the sending processor completes the splice, the last-message pointer 46 continues to point to slot 6 and the length field 42 continues to indicate that the length of the message list 34 is only six slots and not seven.

A messaging system operating as described above enables a sending processor to broadcast a single message to several intended recipients. This is because the destination mask 52 of each message slot includes a data element (such as a bit) that corresponds to each processor in the messaging system. The messaging system of the invention thus eliminates the need to send a separate message to each intended recipient of a message.

To scan the message list 34 for messages, a scanning processor inspects its assigned bit in the attention mask 48 of the message directory 38. If the assigned bit in the attention mask 48 is reset, the scanning processor recognizes that there are no messages intended for it in the message list 34. When this is the case, the scanning processor does not scan the message list 34. This avoids unnecessarily scanning the message list 34.

The scanning processor does not need to lock shared memory 12 when scanning the message list 34 or when inspecting the attention mask 48. As a result, several scanning processors can concurrently scan the message list 34. In addition, a scanning processor can scan the message list 34 even while another processor, either a sending processor or another scanning processor, is modifying the message list 34.

If the scanning processor's assigned bit in the attention mask 48 is set, the scanning processor selects a starting slot on the message list 34 and begins scanning the message list 34 from that starting slot. In one embodiment, the scanning processor selects the starting slot to be the slot identified by the first-message pointer 44 in the message directory 38.

In another embodiment, the scanning processor selects the starting slot to be the slot following the last slot it encountered during a previous scan. In this embodiment, the scanning processor, upon encountering a message for which it is an intended recipient, saves the next-message pointer 56 for that message slot in its local memory. The scanning processor then interrupts its scan while it processes the message. After having processed the message, the scanning processor resumes its scan at the message slot identified by the pointer stored in its local memory. This avoids the need to restart the scan at the beginning of the message list 34. To avoid the possibility of inadvertently skipping over portions of the message list 34, a scanning processor using a pointer stored in local memory will periodically resume scanning from the beginning of the message list 34 rather than from the location identified by the pointer stored in its local memory.

After having selected the starting slot for the scan, the scanning processor inspects that slot's destination mask 52 to determine if it is an intended recipient for the message carried by that slot. If it is, the scanning processor resets its assigned bit in the slot's execution mask 54 and then interrupts the scan to process the message carried in the slot's message field 50. If it is not, the scanning processor follows the slot's next-message pointer 56 and repeats the foregoing procedure. If the scanning processor reaches the last slot of the message list 34 without having encountered a message for which it is an intended recipient, it resets its assigned bit in the attention mask 48 of the message directory 38.

The scanning processor can occasionally encounter a message slot in which the only bit set in the execution mask 54 is its own assigned bit. This can occur if the message is intended only for that scanning processor and no other processors. This can also occur if all other intended recipients for that message have already read the message, and have therefore reset their assigned bits in that slot's execution mask 54. Once the scanning processor reads the message in such a slot, there is no longer a need to include that slot in the message list.

The scanning processor changes such a slot, referred to as a "spent slot," to a free slot to make it available to a sending processor for holding another message. This eliminates the need to periodically execute a garbage-collection process to remove unnecessary slots from the message list 34.

Figure 7:
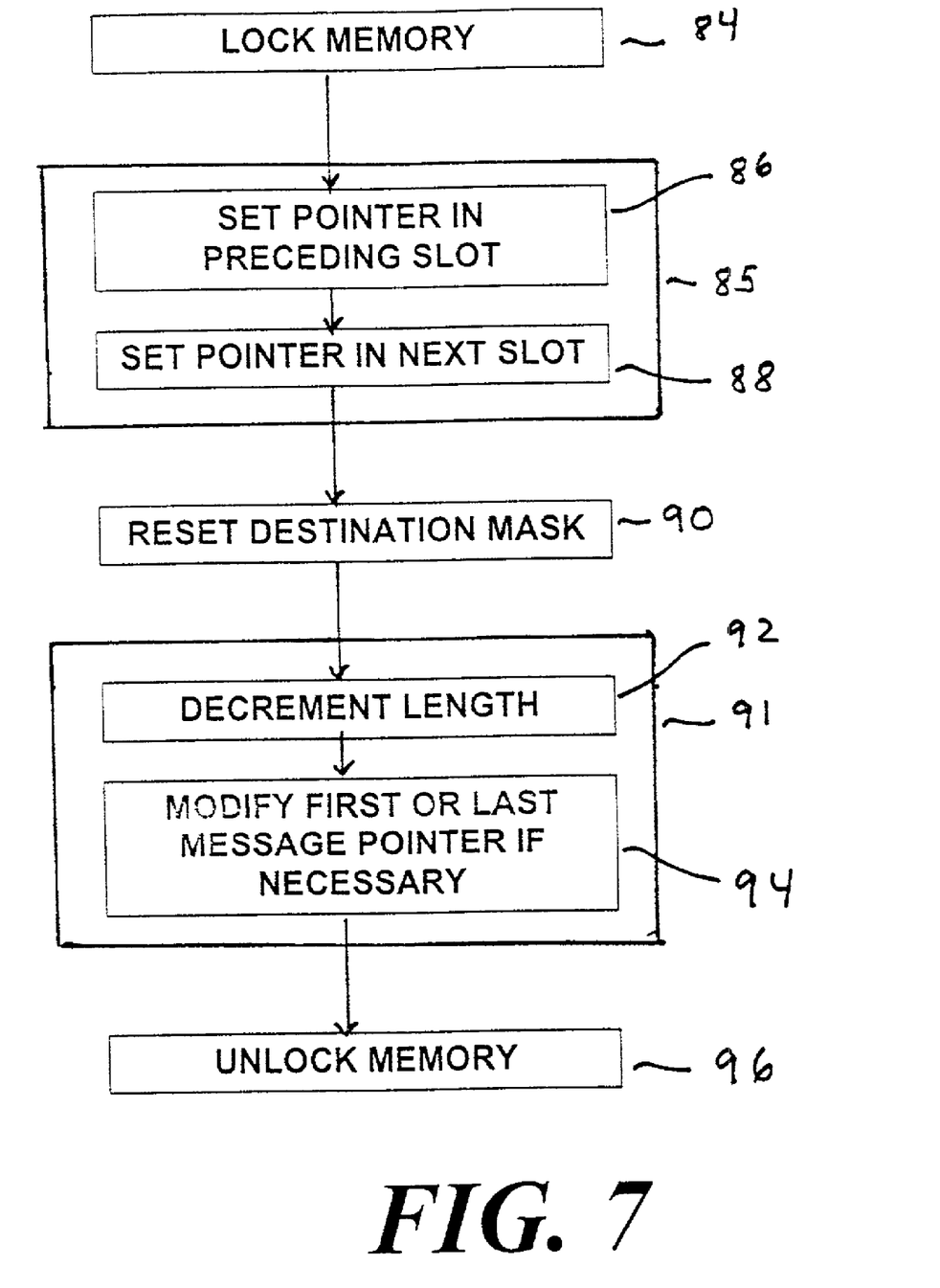
FIG. 7 is a flowchart of a process for removing a message from the message list of FIG. 3.

To free a spent slot, the scanning processor first locks 84 the shared memory 12. The scanning processor then removes 85 the spent slot from the message list by adjusting 86, 88 the pointers of the slots immediately preceding and immediately following the spent slot. In particular, the scanning processor changes 86 the next-message pointer 56 of the slot preceding the spent slot so that it points to the slot immediately following the spent slot. The scanning processor then changes 88 the previous-message pointer 58 of the slot immediately following the spent slot so that it points to the slot immediately preceding the spent slot. The net effect of these two operations is that a scanning processor skips over the spent slot as it scans the message list.

After having removed the spent slot from the message list, the scanning processor marks the spent slot as free by resetting 90 all bits in its destination mask 52. The next-message pointer 56 and the previous-message pointer 58 of the spent slot remain unaltered.

The scanning processor then updates 91 the message directory 38 by decrementing 92 the length field 42 of the message directory 38. If the spent slot is either the first of last slot in the message list 34, the scanning processor also modifies 94 the first-message pointer 44 or the last-message pointer 46 of the message directory. Finally, the scanning processor unlocks 96 the shared memory 12.

Figure 8:
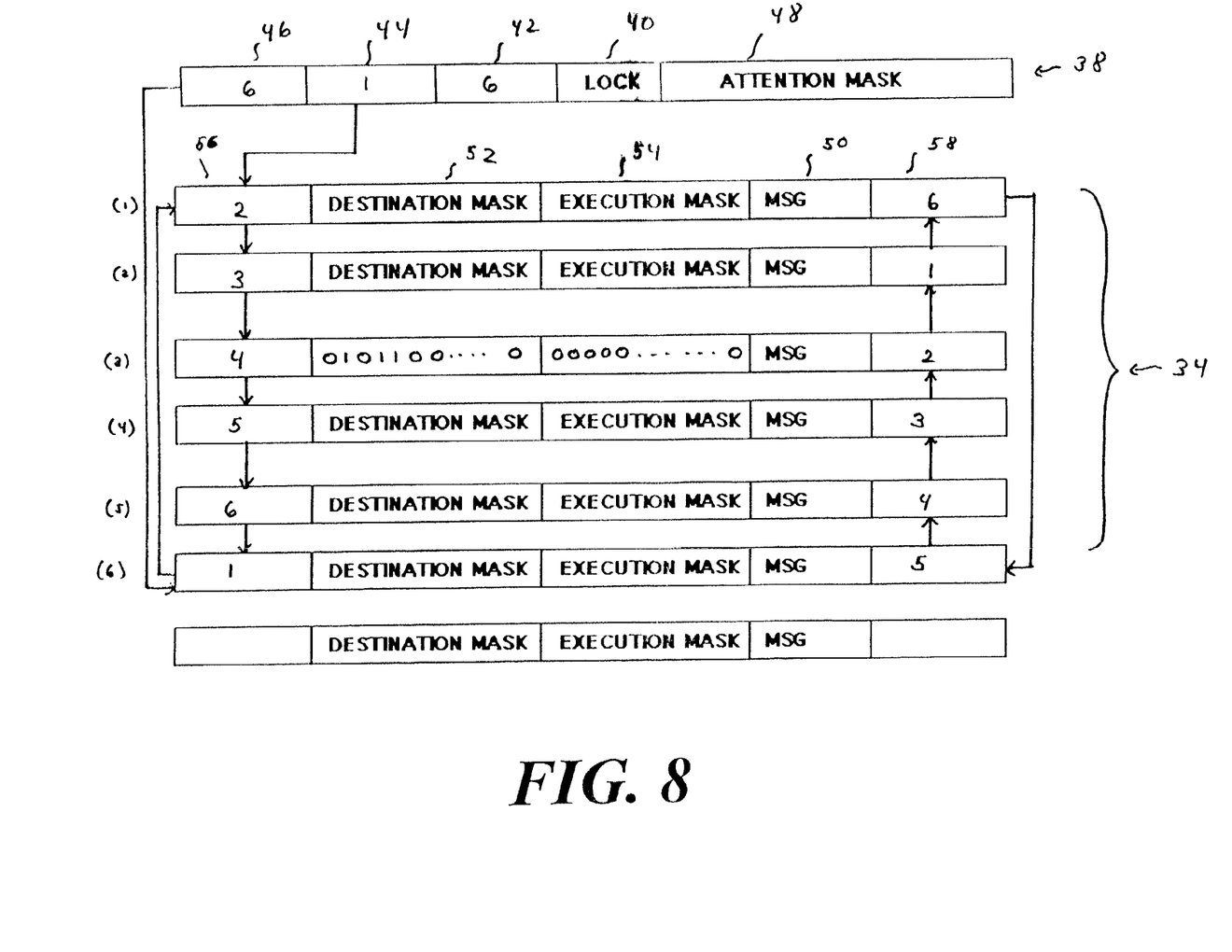
FIG. 8 shows the message list of FIG. 3 before removing a message.

FIG. 8 shows the state of the message section 30 just before a spent slot transitions from being an occupied slot to a free slot. As indicated by the message directory 38, the message list 34 has six slots linked to each other by pairs of pointers. For convenience, the slots are numbered from 1 to 6. The spent slot that is about to transition to its free state, namely slot 3, is shown with its execution mask 54 completely reset. This indicates that the message carried by that slot has been read by all its intended recipients.

Figure 9:
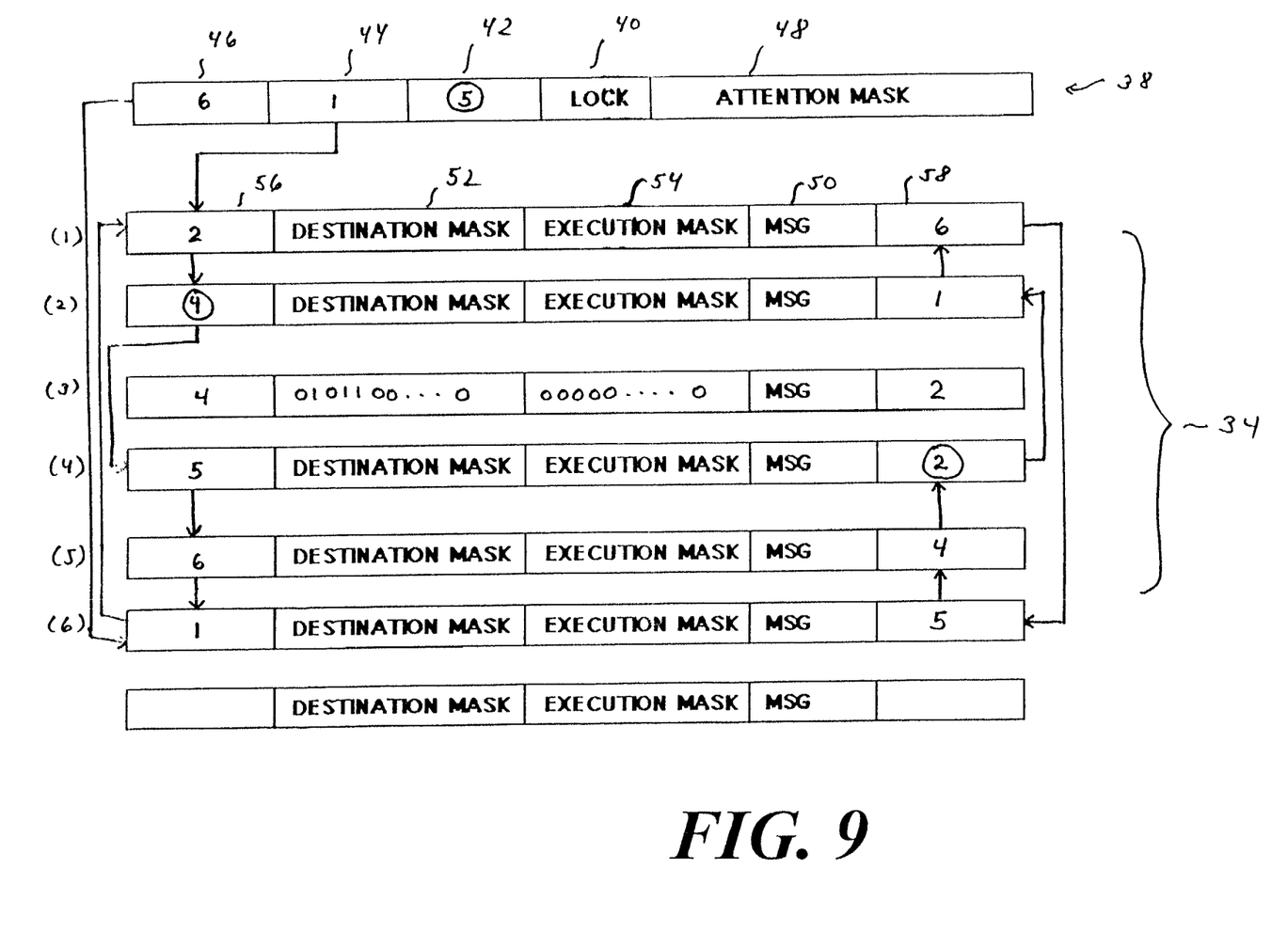
FIG. 9 shows the message list of FIG. 3 after removing a message.

FIG. 9 shows the message list 34 after slot 3 transitions into its free state. The destination mask 52 of the slot has been completely reset. Note that the next-message pointer 56 and the previous-message pointer 58 are unchanged. The message directory 38 has been updated to show that there are now five slots in the message list 34. Since slot 3 was neither the first nor last slot in the message list, the first and last message pointers 44, 46 are also unchanged.

By removing spent slots from the message list 34 in the manner described above, the inter-processor messaging system of the invention enables one scanning processor to scan the message list 34 even while another scanning processor removes a spent slot from the message list 34.

For example, in the case shown in FIGS. 8 and 9, a second scanning processor scanning the message list 34 will encounter slot 2 either before, or after a first scanning processor completes the splicing operation. If the second scanning processor encounters slot 2 after the first scanning processor completes the splicing operation, the next-message pointer 56 of slot 2 will direct the scanning processor to slot 4, correctly skipping over slot 3 in the process. If the second scanning processor reaches slot 2 before the first scanning processor can complete the splicing operation, the next-message pointer 56 of slot 2 will direct the second scanning processor to slot 3. After examining the execution mask 54 of slot 3, the second scanning processor follows the next-message pointer 56 of slot 3. Since the next-message pointer 56 of slot 3 still points to slot 4, the second scanning processor will proceed correctly to slot 4. Hence, in either case, the second scanning processor correctly reaches slot 4.

The slot-removal process described in connection with FIGS. 7-9 thus distributes garbage-collection among the scanning processors, thereby eliminating the need to run a separate garbage-collection process. Since the scanning processors remove spent slots as they scan the message list 34, there is no need to complete a separate scan of the message list solely for the purpose of garbage-collection.

It is to be understood that while the invention has been described in conjunction with the foregoing detailed description, the foregoing description is intended only to illustrate one practice of the invention. The scope of the invention, is defined by the appended claims.

Having described the invention, and a preferred embodiment thereof, what I claim as new and secured by Letters Patent is:

1. A method for using a computer to assist a particular data storage machine in posting a message on a message list stored in a memory, said message list being accessible to a plurality of processors, said method comprising:

receiving, at the data storage machine, from one of the plurality of processors, a message to be posted on said message list, said message having an intended recipient selected from said plurality of processors having access to said message list, wherein said message list includes messages having different intended recipients;

selecting a new-message slot from said message list accessible to said plurality of processors;

placing said message to be posted on said message list in said new-message slot;

modifying said new-message slot to specify said intended recipient of said message, said intended recipient being selected from said plurality of processors having access to said message list; and inserting said new-message slot into said message list, said message list including a first existing-message slot having a pointer to a second existing-message slot, wherein inserting said new-message slot into said message list comprises setting a first pointer on said new-message slot to point to said first existing-message slot and a second pointer on said new-message slot to point to said second existing messsage-slot.

2. The method of claim 1 wherein inserting said new-message slot into said message list further comprises setting said pointer associated with said first existing-message slot to point to said new-message slot.

3. The method of claim 1, wherein modifying said new-message slot to specify an intended recipient comprises modifying a destination mask associated with said new-message slot, said destination mask including information specifying all intended recipients of said message.

4. The method of claim 3, wherein modifying said destination mask comprises:
selecting, from a plurality of constituent data-elements of said destination mask, each of said constituent data-elements corresponding to one of said processors from said plurality of processors, a selected data-element corresponding to a selected processor; and
modifying said selected data-element to indicate that said selected processor is an intended recipient.

5. The method of claim 1, further comprising updating a message directory to indicate the presence of said new-message slot in said message list, said message directory being accessible to said plurality of processors.

6. The method of claim 5, wherein updating said message directory comprises updating an attention mask containing information indicative of which processors from said plurality of processors are intended recipients of messages contained in said message list.

7. The method of claim 6, wherein updating said attention mask comprises:
selecting from a plurality of constituent data-elements of said attention mask, each of said constituent data-elements corresponding to one of said processors from said plurality of processors, a selected data-element corresponding to a selected processor; and
modifying said selected data-element to indicate existence of a new message for which said selected processor is an intended recipient.

8. A method for using a computer to assist a particular data storage machine in posting a message on a message list stored in a memory, said message list being accessible to a plurality of processors, said method comprising:
receiving, at the data storage machine, from one of the plurality of processors, a message to be posted on said message list, said message having an intended recipient selected from said plurality of processors having access to said message list, wherein said message list includes messages having different intended recipients;
selecting a new-message slot from said message list accessible to said plurality of processors;
placing said message to be posted on said message list in said new-message slot; and
modifying said new-message slot to specify said intended recipient of said message, said intended recipient being selected from said plurality of processors having access to said message list,
wherein modifying said new-message slot to specify an intended recipient comprises modifying a destination mask associated with said new-message slot, said destination mask including information specifying all intended recipients of said message.

9. The method of claim 8, further comprising inserting said new-message slot into said message list, said message list including a first existing-message slot having a pointer to a second existing-message slot.

10. The method of claim 9, wherein inserting said new-message slot into said message list comprises setting a first pointer on said new-message slot to point to said first existing-message slot and a second pointer on said new-message slot to point to said second existing message-slot.

11. The method of claim 10, wherein inserting said new-message slot into said message list further comprises setting said pointer associated with said first existing-message slot to point to said new-message slot.

12. The method of claim 8, wherein modifying said destination mask comprises:
selecting, from a plurality of constituent data-elements of said destination mask, each of said constituent data-elements corresponding to one of said processors from said plurality of processors, a selected data-element corresponding to a selected processor; and
modifying said selected data-element to indicate that said selected processor is an intended recipient.

13. The method of claim 8, further comprising updating a message directory to indicate the presence of said new-message slot in said message list, said message directory being accessible to said plurality of processors.

14. The method of claim 13, wherein updating said message directory comprises updating an attention mask containing information indicative of which processors from said plurality of processors are intended recipients of messages contained in said message list.

15. The method of claim 14, wherein updating said attention mask comprises:
selecting from a plurality of constituent data-elements of said attention mask, each of said constituent data-elements corresponding to one of said processors from said plurality of processors, a selected data-element corresponding to a selected processor; and
modifying said selected data-element to indicate existence of a new message for which said selected processor is an intended recipient.

16. A method for using a computer to assist a particular data storage machine in posting a message on a message list stored in a memory, said message list being accessible to a plurality of processors, said method comprising:
receiving, at the data storage machine, from one of the plurality of processors, a message to be posted on said message list, said message having an intended recipient selected from said plurality of processors having access to said message list, wherein said message list includes messages having different intended recipients;
selecting a new-message slot from said message list accessible to said plurality of processors;
placing said message to be posted on said message list in said new-message slot;
modifying said new-message slot to specify said intended recipient of said message, said intended recipient being selected from said plurality of processors having access to said message list; and
updating a message directory to indicate the presence of said new-message slot in said message list, said message directory being accessible to said plurality of processors;
wherein updating said message directory comprises updating an attention mask containing information indicative of which processors from said plurality of processors are intended recipients of messages contained in said message list.

17. The method of claim 16, further comprising inserting said new-message slot into said message list, said message list including a first existing-message slot having a pointer to a second existing-message slot.

18. The method of claim 17, wherein inserting said new-message slot into said message list comprises setting a first pointer on said new-message slot to point to said first existing-message slot and a second pointer on said new-message slot to point to said second existing message-slot.

19. The method of claim 18, wherein inserting said new-message slot into said message list further comprises setting said pointer associated with said first existing-message slot to point to said new-message slot.

20. The method of claim 16, wherein modifying said new-message slot to specify an intended recipient comprises modifying a destination mask associated with said new-message slot, said destination mask including information specifying all intended recipients of said message.

21. The method of claim 20, wherein modifying said destination mask comprises:
selecting, from a plurality of constituent data-elements of said destination mask, each of said constituent data-elements corresponding to one of said processors from said plurality of processors, a selected data-element corresponding to a selected processor; and
modifying said selected data-element to indicate that said selected processor is an intended recipient.

22. The method of claim 16, wherein updating said attention mask comprises:
selecting from a plurality of constituent data-elements of said attention mask, each of said constituent data-elements corresponding to one of said processors from said plurality of processors, a selected data-element corresponding to a selected processor; and
modifying said selected data-element to indicate existence of a new message for which said selected processor is an intended recipient.

23. A computer system for assisting a particular data storage system in posting a message on a message list stored in a memory, said message list being accessible to a plurality of processors, said system including:
a memory having stored therein instructions for:
receiving, from one of the plurality of processors, a message to be posted on said message list, said message having an intended recipient selected from said plurality of processors having access to said message list, wherein said message list includes messages having different intended recipients;
selecting a new-message slot from said message list accessible to said plurality of processors;
placing said message to be posted on said message list in said new-message slot;
modifying said new-message slot to specify said intended recipient of said message, said intended recipient being selected from said plurality of processors having access to said message list; and
inserting said new-message slot into said message list, said message list including a first existing-message slot having a pointer to a second existing-message slot,
wherein inserting said new-message slot into said message list comprises setting a first pointer on said new-message slot to point to said first existing-message slot and a second pointer on said new-message slot to point to said second existing message-slot;
and a processor configured to execute said instructions stored in memory.

24. A computer system for assisting a particular data storage system in posting a message on a message list stored in a memory, said message list being accessible to a plurality of processors, said system comprising:
a memory having stored therein instructions for:
receiving, from one of the plurality of processors, a message to be posted on said message list, said message having an intended recipient selected from said plurality of processors having access to said message list, wherein said message list includes messages having different intended recipients;
selecting a new-message slot from said message list accessible to said plurality of processors;
placing said message to be posted on said message list in said new-message slot; and
modifying said new-message slot to specify said intended recipient of said message, said intended recipient being selected from said plurality of processors having access to said message list,
wherein modifying said new-message slot to specify an intended recipient comprises modifying a destination mask associated with said new-message slot, said destination mask including information specifying all intended recipients of said message; and
a processor configured to execute said instructions stored in memory.

25. A computer system for assisting a particular data storage system in posting a message on a message list stored in a memory, said message list being accessible to a plurality of processors, said system comprising:
a memory having stored therein instructions for:
receiving, from one of the plurality of processors, a message to be posted on said message list, said message having an intended recipient selected from said plurality of processors having access to said message list, wherein said message list includes messages having different intended recipients;
selecting a new-message slot from said message list accessible to said plurality of processors;
placing said message to be posted on said message list in said new-message slot;
modifying said new-message slot to specify said intended recipient of said message, said intended recipient being selected from said plurality of processors having access to said message list; and
updating a message directory to indicate the presence of said new-message slot in said message list, said message directory being accessible to said plurality of processors;
wherein updating said message directory comprises updating an attention mask containing information indicative of which processors from said plurality of processors are intended recipients of messages contained in said message list; and
a processor configured to execute said instructions stored in memory.

* * * * *